Oct. 6, 1925.
I. J. EDWARDS
CHILD'S VEHICLE
Filed Feb. 4, 1924
1,556,090
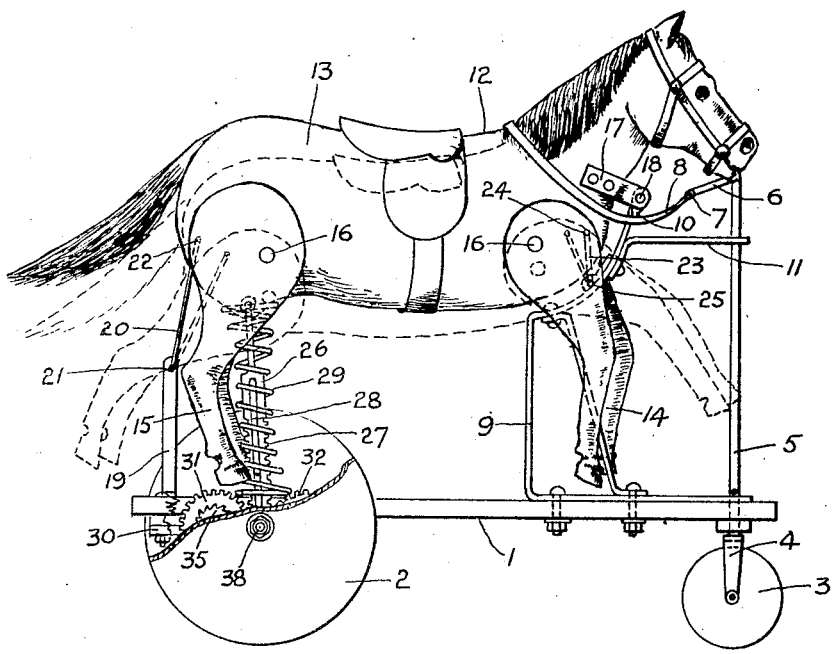
Fig.1.
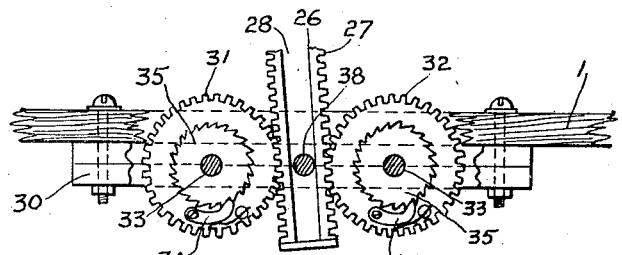
Fig.2.
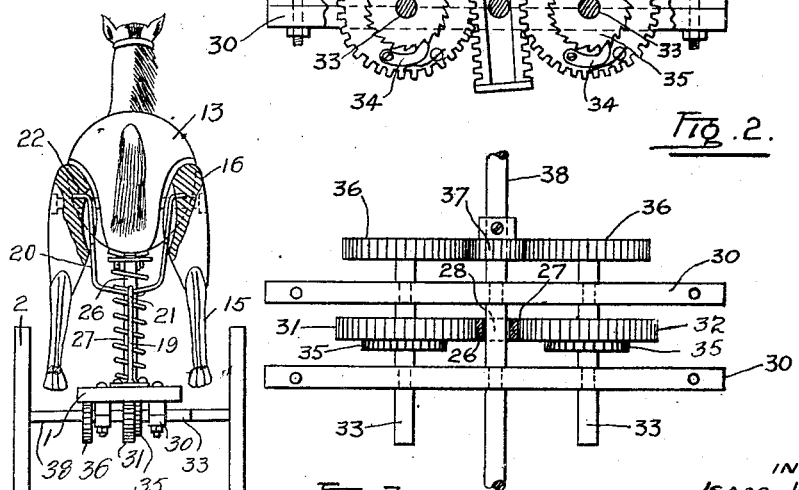
Fig.4.
Fig.3.
INVENTOR
ISAAC JOHN EDWARDS
BY Fetherstonhaugh & Co
ATTORNEYS Patented Oct. 6, 1925.

1,556,090

UNITED STATES PATENT OFFICE.

ISAAC JOHN EDWARDS, OF VANCOUVER, BRITISH COLUMBIA, CANADA.

CHILD'S VEHICLE.

Application filed February 4, 1924. Serial No. 690,594.

*To all whom it may concern:*

Be it known that I, ISAAC JOHN EDWARDS, a subject of the King of Great Britain, and a resident of the city of Vancouver, in the Province of British Columbia, Canada, have invented certain new and useful Improvements in Children's Vehicles, of which the following is a specification.

My invention relates to improvements in mechanical toys the objects of which are to provide a double acting stroke propelling mechanism, and a coaster action, a further object is to provide in a mechanical toy a representation of an animal simulating life like motions with its legs and body as it is being ridden and propelled by the child using it.

The invention consists essentially of a toy animal mounted upon a wheeled platform, such animal being hinged thereabove and having legs pivoted to the body and means as the animal is oscillated about its hinge for moving its legs and driving the wheels of the platform, as will be more fully described in the following specification in which:—

Fig. 1 is a general view of my invention, a portion of one rear wheel and a portion of the platform cut away to show the disposition of the propelling mechanism.

Fig. 2 is an enlarged side view of the propelling mechanism.

Fig. 3 is a plan view of same looking down.

Fig. 4 is a rear view showing the manner in which swinging movement is imparted to the rear legs of the horse.

In the drawings like characters of reference indicate corresponding parts in each figure.

The numeral 1 indicates a platform of sufficient width to accommodate the feet of the child using the device. 2 indicates a pair of rear wheels one of which is keyed to one end of, and is rotated by the driven shaft 38, the other being freely rotatable upon the opposite end thereof. 3 is a front wheel which is mounted within a fork 4. 5 is a steering rod projecting upwardly through the platform 1 and rotatably mounted therein. 6 is a V-shaped yoke attached at its apex to the rod 5 and having its outer ends apertured as at 7 for the attachment of the reins 8.

The numeral 9 indicates generally an upstanding bracket secured at its base to the platform 1 having an eye 10 formed at its upper extremity, the purpose of which will appear later. 11 is a horizontally disposed arm extending from the bracket 9 through the outer end of which the steering rod 5 passes and derives support. The numeral 12 indicates generally a model horse in which 13 is the body, 14 the fore legs and 15 the rear legs, all four legs are pivoted as at 16 for swinging movement. The body of the animal is provided adjacent the breast with a hinge strap 17 which is connected to the eye 10 of the bracket 9 by a pin 18 upon which the body of the animal is fulcrumed.

The numeral 19 indicates a standard securely mounted upon the rear of the platform 1 having a pair of connecting rods 20 pivotally mounted adjacent its upper end as at 21, the opposite end of the rods 20 being pivotally connected to the haunches of the legs 15 as at 22, so that as the body 12 is depressed the legs swing rearwardly as is indicated by dotted line. The front legs 14 are similarly provided with connecting rods 23 pivotally connected to their upper forward portions as at 24 and at the opposite ends to an eye 25 carried upon the bracket 9 so that on the body being depressed the fore legs 14 swing forwardly as indicated by dotted line.

Suitably pivoted to the underside of the body is a rack 26 having gear teeth 27 on both forward and rear edges and between which is an elongated slot 28 the purpose of which will hereinafter appear, surrounding the rack is a coil spring 29 which is adapted to rest upon the platform 1 and exert an upward pressure to the body 12 to restore it to its normal raised position and to impart an upward movement to the rack 26 when the weight of the child is lifted from the body 12. The numeral 30 (see Figs. 2 and 3) indicates a pair of frame members secured to the platform in which the gear wheels and the driving shafts of the propelling mechanism are journalled. 31 and 32 indicate a pair of freely rotatable gear wheels which are journalled on countershafts 33 and are driven by the rack 26, the gears 31 and 32 are each provided with a spring pressed pawl 34 engaging the teeth of a ratchet wheel 35 secured to the countershafts 33, at one end of each of the countershafts a driving gear 36 is secured, both of which mesh with the driven pinion 37 on the driven shaft 38 to communicate the drive to one of the wheels 2.

It will be seen that as the body 12 of the animal is pressed down by the weight of the child towards the platform 1 that effort is exerted through the rack 26 by means of the teeth on the forward side thereof to the gear wheel 32 and through its pawl 34 to one ratchet wheel 35 which causes a driving gear 36 to rotate, thereby communicating the final drive through the pinion 37 to the shaft 38 and the road wheel 2. On the upstroke of the body and the corresponding stroke of the rack 26 which is brought about by the weight being removed from the body 12 and the elongation of the spring 29 the gear teeth on the rear side of the rack communicate the effort of the spring through the gear wheel 31 and its ratchet and corresponding gears to the final drive. When coasting the rack 26 and the gears 31 and 32 remain stationary, the pawls 34 riding over the teeth of the ratchet wheels 35 which with the countershafts 32 and their gears are free to rotate in a forward direction.

Rearward movement is imparted to the legs 15 by the downward movement of the body 13 causing a like movement of the pin 16 upon which the legs are pivoted by maintaining the rear portion of the haunches at a substantially constant vertical distance above the wheeled platform by means of the standard 19 and the connecting rods 20.

While I have shown a method of propulsion as applied to a model horse it will be obvious that the same principle may be applied in other mechanical toys without altering the principle involved or departing from the spirit of the invention.

What I claim as my invention is:

1. In a child's vehicle, a propelling mechanism comprising a shaft driven from a counter shaft having a fixed ratchet wheel thereon, a freely rotatable gear having a pawl in engagement with said ratchet wheel and a reciprocating rack having teeth in engagement with said gear.

2. In a child's vehicle, a propelling mechanism comprising a pair of counter shafts, a shaft driven from either of said counter shafts, a ratchet wheel fixed to each counter shaft, a freely rotatable gear adjacent to each ratchet wheel, pawls forming a driving connection between each gear and its ratchet wheel, and a reciprocating rack having opposed sets of rack teeth, each set engaging with one of the freely rotatable gears.

3. A mechanical toy comprising a wheel platform, an upstanding bracket thereon, a figure comprising a body pivotally supported adjacent its forward end by said bracket, propelling mechanism for the platform connected with the rear portion of the body to be actuated by movement of the latter about its point of pivotal support, front and rear legs pivoted to corresponding portions of the body, links connected between the aforementioned bracket and the front legs and arranged to cause swinging movement of said legs in response to pivotal movement of the body and further links connected to the rear legs at one end and anchored to the platform at the opposite ends for causing swinging movement of the rear legs in response to pivotal movement of the body.

Dated at Vancouver, B. C., this 22nd day of December, 1923.

ISAAC JOHN EDWARDS.